(12) United States Patent
Glovier (10) Patent No.: US 12,509,314 B2
(45) Date of Patent: Dec. 30, 2025

(54) TIME OF FLIGHT GRAIN CART FILL SENSOR WITH COMBINED SPOUT AS SCANNING HEAD

(71) Applicant: CNH Industrial America LLC, Racine, WI (US)

(72) Inventor: Scott Glovier, Lombard, IL (US)

(73) Assignee: CNH Industrial America LLC, New Holland, PA (US)

( * ) Notice: Subject to any disclaimer, the term of this patent is extended or adjusted under 35 U.S.C. 154(b) by 420 days.

(21) Appl. No.: 18/086,221

(22) Filed: Dec. 21, 2022

(65) Prior Publication Data

US 2024/0208747 A1   Jun. 27, 2024

(51) Int. Cl.
| | |
|---|---|
| *B65G 67/22* | (2006.01) |
| *B65G 69/04* | (2006.01) |
| *G01F 23/284* | (2006.01) |
| *G01F 23/2962* | (2022.01) |
| *G05D 1/00* | (2024.01) |

(52) U.S. Cl.
CPC ......... *B65G 67/22* (2013.01); *B65G 69/0441* (2013.01); *G05D 1/0212* (2013.01); *B65G 2203/0233* (2013.01); *G01F 23/284* (2013.01); *G01F 23/2962* (2013.01)

(58) Field of Classification Search
CPC ............... B65G 67/22; B65G 69/0441; B65G 2203/0233; G05D 2300/15; G05D 2300/158; G05D 2720/24; G01F 23/284; G01F 23/2962; A01D 41/1275
See application file for complete search history.

(56) References Cited

U.S. PATENT DOCUMENTS

| | | |
|---|---|---|
| 7,877,181 B2 | 1/2011 | Chervenka et al. |
| 9,119,342 B2 | 9/2015 | Bonefas |
| 9,272,853 B2 * | 3/2016 | Van Mill .................. B60P 1/42 |
| 9,392,746 B2 | 7/2016 | Darr et al. |
| 9,545,048 B2 | 1/2017 | Pickett et al. |
| 9,973,710 B2 | 5/2018 | Boydens et al. |
| 10,015,928 B2 | 7/2018 | Nykamp et al. |

(Continued)

OTHER PUBLICATIONS

Liu et al., Z. Development and Experimental Validation of a System for Agricultural Grain Unloading-on-the-Go, Google Scholar, Elsevier, Computers and Electronics in Agriculture, vol. 198, Jul. 2022, pp. 1-17. (Year: 2022).*

(Continued)

*Primary Examiner* — Russell Frejd
(74) *Attorney, Agent, or Firm* — Fletcher Yoder, P.C.

(57) ABSTRACT

Systems and methods are disclosed for sensing and analyzing filling of a grain cart while receiving grain from a combine. Time-of-flight sensors may be mounted on a grain spout (or nozzle) extending from the combine over the grain cart during operation. The sensors provide signals indicative of distances of surfaces of accumulating grain from the sensors, and these distances may be determined by onboard processing circuitry. A third sensor may detect a spout-to-ground distance to help compute the grain level information. Other parameters such as cross-sectional areas, volumes, and locations in the cart may be determined based on the sensed signals. Open or closed loop control of cart and/or combine positioning may be provided based on the signals.

20 Claims, 5 Drawing Sheets

(56) References Cited

U.S. PATENT DOCUMENTS

| | | |
|---|---|---|
| 10,028,441 B2 | 7/2018 | Van Mill et al. |
| 10,537,061 B2 | 1/2020 | Farley et al. |
| 11,008,177 B2 | 5/2021 | Banthia et al. |
| 2013/0103249 A1* | 4/2013 | Pieper .................... G08G 1/166 |
| | | 701/25 |
| 2014/0012489 A1* | 1/2014 | Pieper .................. G05D 1/0291 |
| | | 701/117 |
| 2015/0094944 A1* | 4/2015 | Baumann ............. A01D 43/086 |
| | | 701/408 |
| 2017/0208742 A1* | 7/2017 | Ingibergsson ......... A01D 75/00 |
| 2019/0322461 A1* | 10/2019 | Banthia ..................... B60P 1/56 |
| 2021/0294337 A1* | 9/2021 | Van Mill .............. G05D 1/0246 |
| 2023/0180659 A1* | 6/2023 | Grieshop ............... A01D 75/18 |
| | | 56/16.6 |
| 2024/0206391 A1* | 6/2024 | Glovier .............. A01D 41/1275 |

OTHER PUBLICATIONS

Gaard, John David, "Grain wagon fill detection using ultrasonic sensors," Iowa State University, 2012, 119 pages.

Posselius et al., "Autonomous self-propelled units: what is ready today and to come in the near future," Proceedings of the 23rd Annual Meeting Club of Bologna, Nov. 2012, 11 pages.

Shkanaev, A.Y. et al., "Grain Wagon Fill Detection using Camera and Deep Convolution Network," International Journal of Applied Engineering Research, vol. 12, No. 21, 2017, 5 pages.

\* cited by examiner

TIME OF FLIGHT GRAIN CART FILL SENSOR WITH COMBINED SPOUT AS SCANNING HEAD

BACKGROUND

The present disclosure relates generally to a time-of-flight grain cart fill sensor with combined spout as scanning head.

Many grains are harvested by combine harvesters (combines), which cut, partially process, and separate grain for collection. Modern combines are driven in a field being harvested by an operator, and collection vehicles, such as grain carts, approach the combines to collect the grain as the harvest progresses. The combines also include their own grain tanks that serve to temporarily store grain when needed, such as during the times when a full cart leaves and a next cart is positioned to receive the grain. But this is short-term storage only, and the process should be smooth and continuous to efficiently proceed with harvest.

Thus, combines routinely unload their grain tank into a grain cart pulled by a tractor such that the combine can continue harvesting without overfilling its grain tank. The unloading process is currently a manual operation where the combine operator typically unloads gain in a specific area of the grain cart until that area is full, then the combine and grain cart are repositioned such that an empty area of the grain cart can then be filled.

There is a need to improve on this system, and to at least partially automate it, or to augment and help the machine operators in properly and efficiently filling the carts, and positioning the machines, and coordinate for successive carts during harvest.

SUMMARY

In certain embodiments, the disclosure sets forth a system comprising a pair of sensors positioned to sense an upper surface of grain being transferred into a grain cart by a combine, the sensors being mounted on a grain spout or nozzle extended from the combine over the grain cart during operation. Processing circuitry receives and analyzes signals based upon output of the sensors, and determines height data representative of height of the grain in the grain cart. An operator interface coupled to the processing system and that outputs an operator perceptible notice based on the height of the grain in the grain cart.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In accordance with aspects of the disclosure, an electronic system is provided to measure the current fill level of grain in a given section of a grain cart. The system is particularly useful for efficient filling of grain carts while allowing for spill prevention, feedback to an automated filling system, and calculating the percent fill of the grain cart of operational logistics applications.

Two time of flight sensors (e.g., ultrasonic or radar) may be mounted to the front and back of a combine spout looking down at the grain mound. The output of these two sensors together can be used to determine the height of the grain, such as though an average of the signals from the two sensors. The position of the grain unloaded into the grain cart can be determined using GPS receivers, for example, on both the combine and the grain cart (or grain cart tractor) and the geometry of those systems. A means of measuring the height offset from the combine unload tube to the ground would also be useful in uneven ground conditions. This may be satisfied by an additional time-of-flight sensor mounted on the combine spout pointed down at a location on the spout such that it targets the ground but is also close to the cart. The sensors mounted to the spout looking down at the grain cart could also be coupled to the movement of the spout tilt mechanism to more directly measure where grain is being unloaded.

At the beginning of an unload event, a routine may determine where the combine spout scans the length of the grain cart to measure the grain cart current fill level as well as to determine how to proceed with filling the cart given where the grain is currently located (if any). This system may also be used as a backup system to measure grain in the case of a high dust event limiting the performance of a primary optical based measuring system such as camera (2D or 3D) or lidar.

Figure 1A:
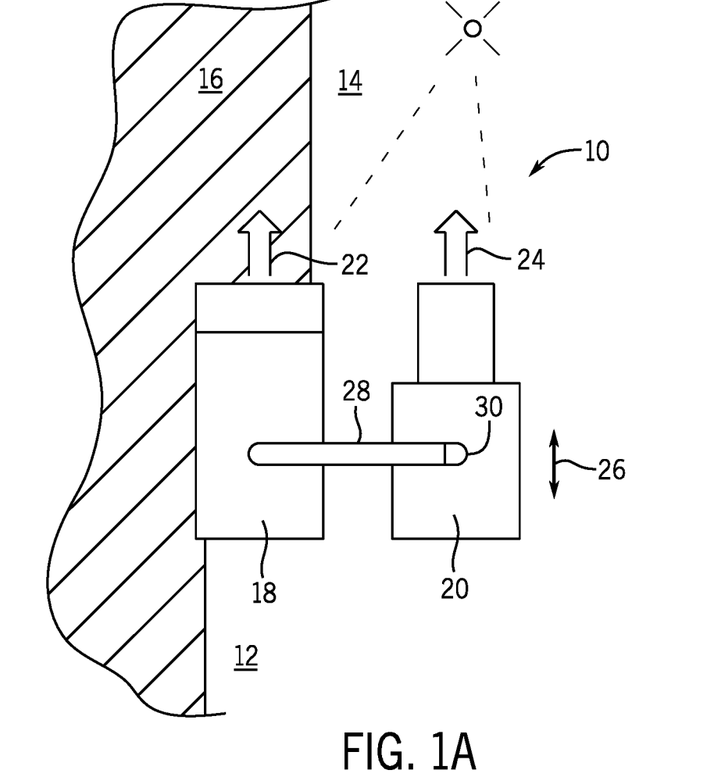
FIG. 1A is a diagrammatical representation of an exemplary combine and grain cart according to the present disclosure.

Referring to the drawings, FIG. 1A is a diagrammatical representation of an exemplary embodiment of a harvesting system 10 for harvesting grain, such as corn, wheat, or any other desired grain from a field 12. As harvesting progresses, the field will include areas 14 that have been harvested, and areas 16 of standing crops. A combine harvester (combine) 18 includes systems for cutting and partially processing the grain (e.g., to separate the grain from stalks, etc.) as will be appreciated by those skilled in the art. The grain is then transferred to a grain cart 20, which may be a vehicle with a containment volume designed to receive and transport the grain, or a towed vehicle pulled by a tractor or other traction machine. The combine proceeds as indicated by arrow 22, while the grain cart advances in parallel as indicated by arrow 24. Relative positions of the combine and the grain cart may be adjusted from time to time, as indicated by arrow 24, so that the grain is deposited where desired in the cart, such as to maximize grain transported per cart, while avoiding or minimizing spillage.

As grain is processed, it may be collected in a grain tank (not shown) internal to the combine, and is ultimately moved into a spout 28 that extends from the combine at least partially over the grain cart. A nozzle 30 may aid in properly reorienting the flow of grain into target areas of the cart. Also shown in FIG. 1A is a graphical representation of a positioning system 32, such as the global positioning system (GPS). The combine or the grain cart, or both may include GPS receivers that aid in locating them in the field, and with respect to one another. Based on such positioning and location systems, the relative positions of the combine and cart may be adjusted, and locations of grain being deposited in the cart may be adjusted (by this relative adjustment of the combine and cart, or by adjustment of some other element, such as the spout and/or the nozzle), as discussed below.

It should be noted that while in the present disclosure reference is made to processes on or in the "grain cart," much or all of the signal processing, GPS location, feedback, and control may be performed by onboard systems of a traction vehicle, such as a tractor, that tows the grain cart, particularly when the grain cart comprises a vehicle such a trailer without its own means of propulsion.

Figure 1B:
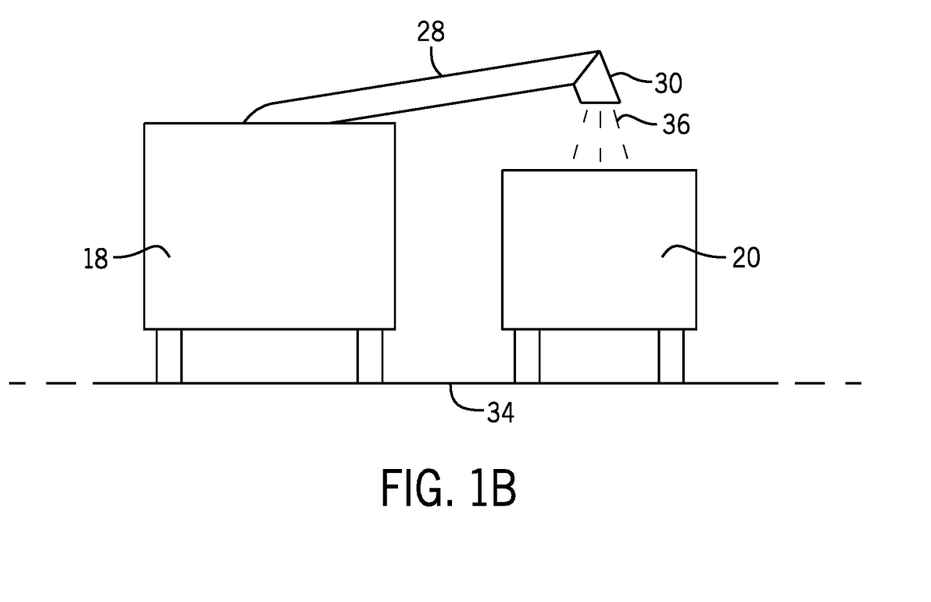
FIG. 1B is a diagrammatical elevation of the combine and cart of FIG. 1.

FIG. 1B is a diagrammatical elevational representation of relative positioning of the combine and cart. Both are shown driving along a ground level, which in practice could be flat, inclined, and so forth, depending upon field conditions. As shown, the spout extends over the cart, and the flow of grain, indicated by reference numeral 36 is directed by the nozzle 30 into the inner volume of the cart.

Figure 2A:
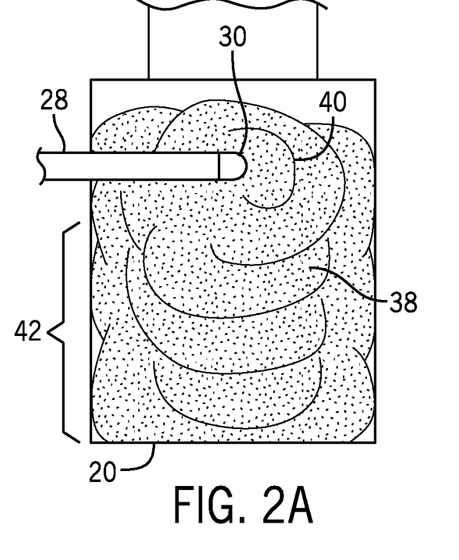
FIGS. 2A-2C are diagrammatical views of grain being delivered to a grain cart, with a sensing system in accordance with the disclosure.
Figure 2B:
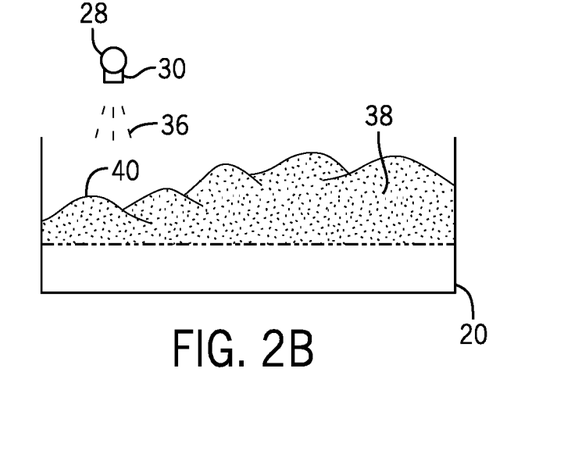
Figure 2C:
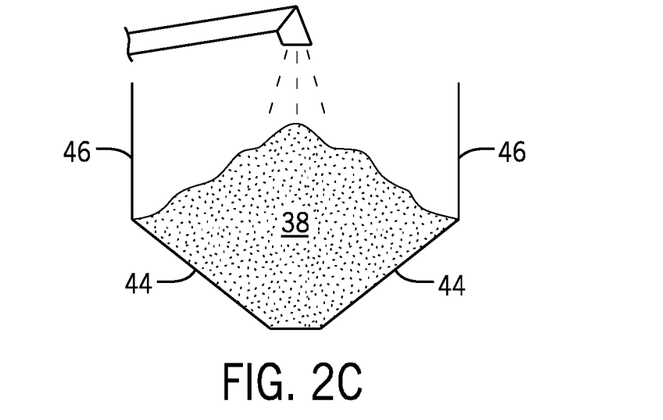

FIGS. 2A-2C are diagrammatical views of grain being delivered to the grain cart, with a sensing system to determine amounts or levels of grain at one or more locations in the cart. As mentioned above, the deposited or transferred grain 38 is delivered by the spout 28 and nozzle 30. The grain will stack and mount in locations over which the nozzle is positioned, as indicated by reference numeral 40. In general, and based on the length of the width and length of the cart, it will be desirable to fill sections of the cart, as indicated by reference numeral 42, and to reposition the combine and/or the cart to progressively fill different sections until the entire cart is satisfactorily filled. A goal of the operation is to maximize the use of the cart volume, while avoiding spillage. In the illustrated embodiment, a sloped bottom 44 is shown for this cart design, which fills first and facilitates later emptying of the cart. Lateral sides 46 extend from the bottom to form an open volume for receiving the grain.

For efficient harvesting, a goal is to continuously operate the combine, while grain carts are rotated in a batch-type manner, with each grain cart being appropriately filled and loaded while avoiding spillage. Once full, grain is retained in the inner grain tank of the combine, until the full grain cart can be moved, and an empty grain cart positioned to take its place. The inner grain tank is then emptied into the new cart and the transfer continued with the new cart being similarly fully loaded.

Figure 3:
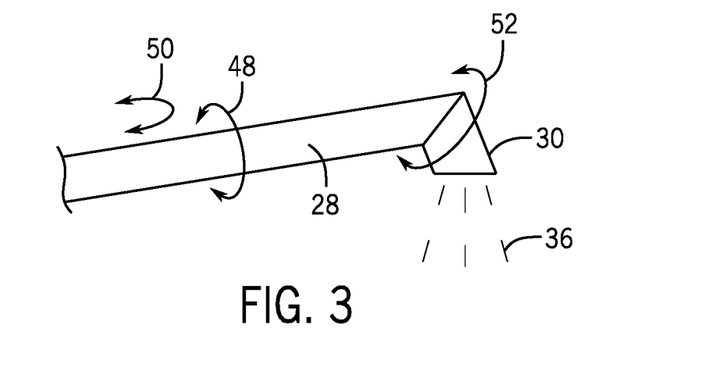
FIG. 3 is a diagrammatical view of a spout extending from a combine and illustrating certain possible positioning options for the spout and its associated nozzle.

In some embodiments it may be possible to influence the location of delivery of grain to the cart by changing the positions of the spout 28 or nozzle 30, or both, as illustrated in FIG. 3. Here, the spout is shown to be capable of rotation as indicated by reference numeral 48, and fore-and-aft movement, as indicated by reference numeral 50. Similarly, the nozzle 30 could be movable as indicated by reference numeral 52. Where provided, such movement may be controlled by appropriate actuators (not shown) that could be controlled by an operator, or by an automated system of the type discussed below. Moreover, such movement could be based on sensing of grain levels as set forth in the present disclosure.

Figure 4A:
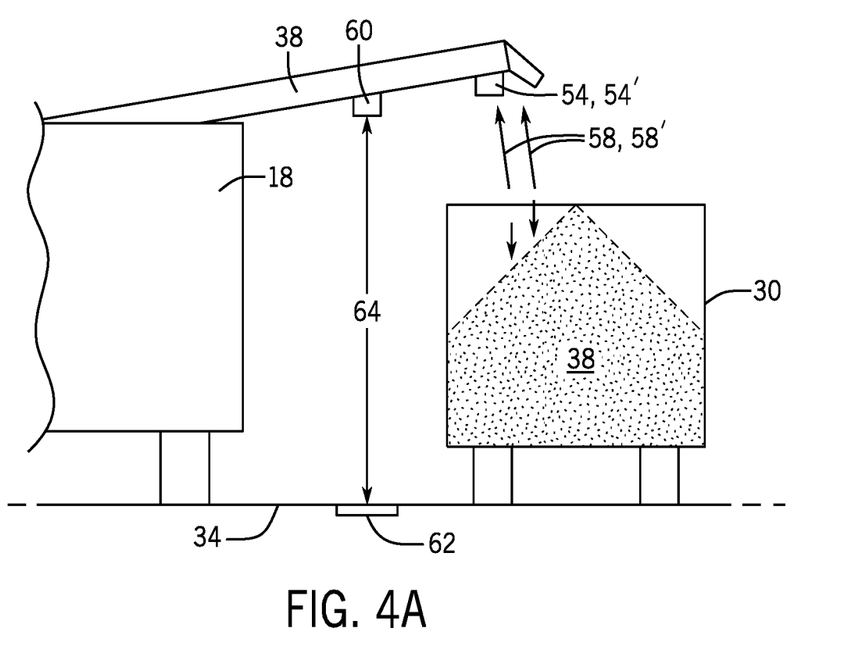
FIGS. 4A and 4B illustrate a technique for sensing grain collecting in the cart as well as height above a ground level.
Figure 4B:
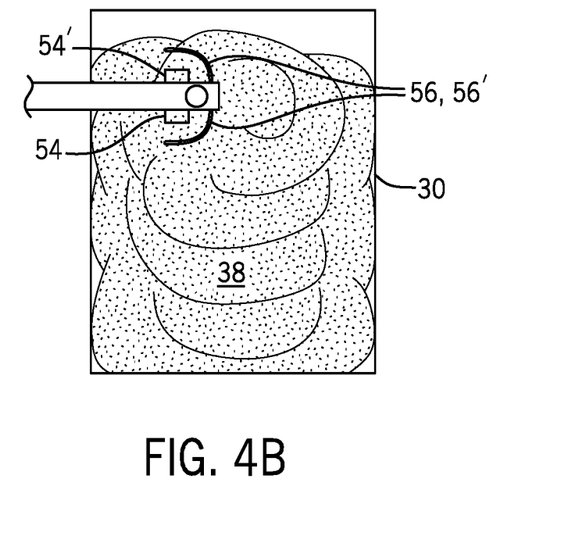

FIGS. 4A and 4B illustrate an exemplary technique for sensing grain collecting in the cart. In the illustrated embodiment, two sensors 54 and 54' are positioned on locations on sides of the spout (or nozzle, which for the present purposes should be considered as included with the spout when reference is made to the latter). In this embodiment, the sensors are positioned in fore and aft positions on either side of the grain spout. Any suitable type of sensor may be used, and in presently contemplated embodiments, time-of-flight sensors such as ultrasound and/or radar sensors are used. In operation, these sensors emit signals that cause a reflected signal to return from areas (see areas 56, 56' in FIG. 4B) of the surface of the grain being deposited. The surface areas of the grain returning the signals will have distances 58 and 58', respectively, from known positions of the sensors, which can be determined by the sensing of the returned signals. Each sensor will be coupled to processing circuitry, described below, as indicated by the dashed lines in FIG. 4B.

In some embodiments, it may be helpful to obtain a height reference signal for the spout, particularly when the levels of the cart, spout, and/or ground change, such as on uneven surfaces or hillsides. A presently contemplated arrangement for this reference is illustrated in FIG. 4A. A sensor 60, which may be the same as sensors 54 and 54' may be mounted on the spout, looking groundward. The sensor will emit a signal towards a location 62 on the ground, and a corresponding signal will be returned for measurement of the height 64 of the sensor about the ground at that point. Known level differences between the sensors 60 and 54/54' may be used as offsets in computing the true distances between sensors 54/54' and the grain surface, where needed, and this in conjunction with any known geometries of the cart. In some cases, an initialization of the reference height and offsets from the positions of the sensors 54/54' may be obtained and/or updated from time to time.

Figure 5:
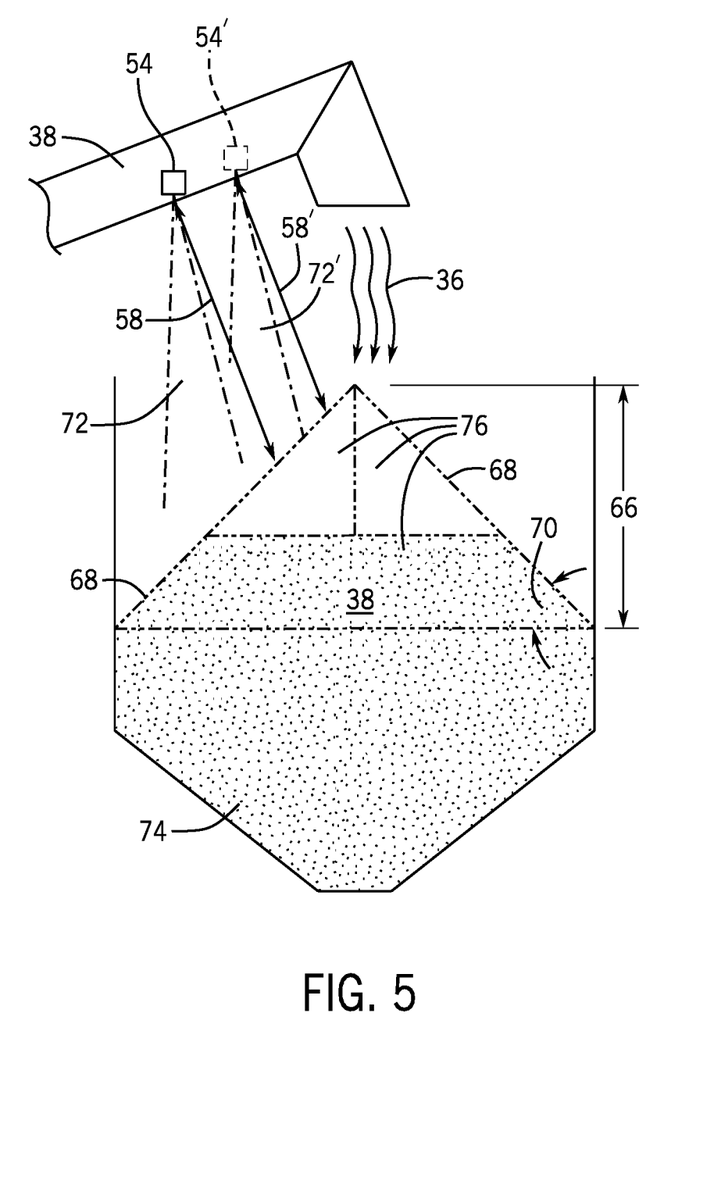
FIG. 5 illustrates an exemplary technique for detecting different surfaces of grain accumulating in a grain cart via an arrangement as shown in FIGS. 4A and 4B.

In general, it will be advantageous to determine levels of grain, though other level-related measurements may be determined and used. As shown in FIG. 5, for example, the grain may be envisaged and analyzed in slices or segments (e.g., "through" the progressively stacking grain). The mound of grain, as shown in the figure, will generally have a more or less well-defined peak 66, with sloping sides 68, which may or may not be the same height. As will be appreciated by those skilled in the art, stacking of granulated materials, if not spread by some mechanical means, may assume a known angle of repose 70, which may depend on the size and type of material, in this case, the grain being harvested.

As shown in FIG. 5, sensors 54 and 54' will emit radiation in beams 72, 72' that return radiation with times of flight that are dependent on the distances between the sensors and the surface areas irradiated. In some embodiments, these may be averaged to determine an effective level of the grain (e.g., in reference to the elevation of the sensors). This may be sufficient for the fill monitoring desired. Further, however, where desired, and where the geometry of the grain cart is known, cross sectional areas and even volumes of grain may be computed by analysis of the grain level (in conjunction of the angle of repose of the particular product being harvested, and the cart geometry). For such analysis, the grain may be subdivided into regions and the areas or volumes computed piecewise, such as including a lower section 74 below the grain-cart side boundary, and upper sections 76 above this level. The overall volume in this slice or section of the cart may then be calculated by addition of these. Moreover, with knowledge of location in the cart, lengthwise, volumes of grain and of grain at locations along the cart may be determined.

Figure 6:
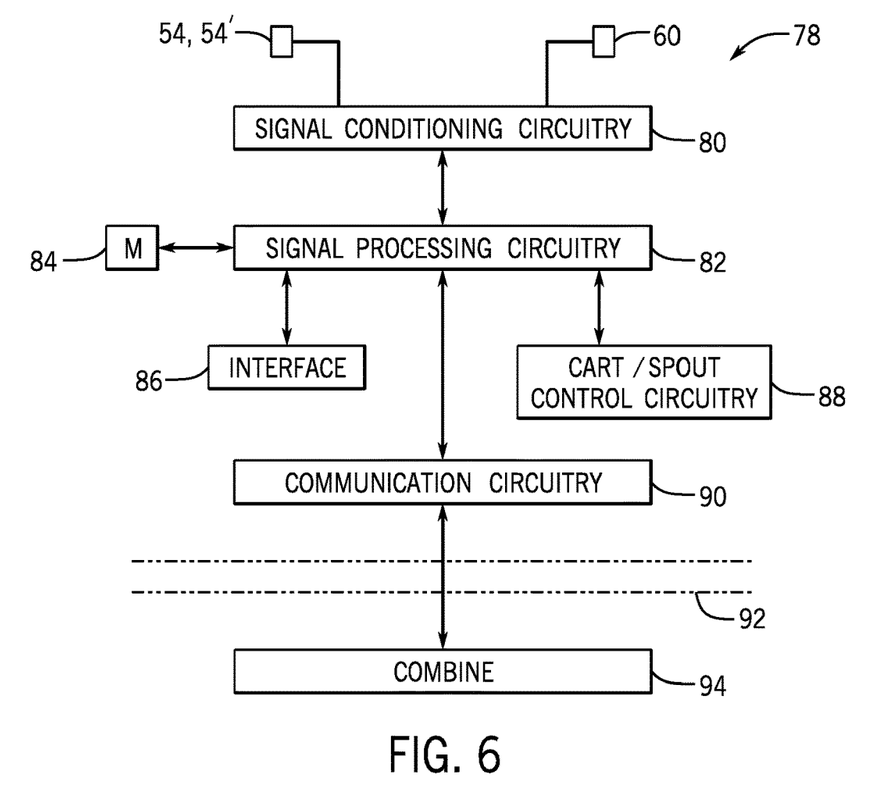
FIG. 6 is a block diagram of exemplary functional components of a system for sensing grain transferred from a combine to a grain cart.

FIG. 6 is a block diagram of exemplary functional components of a system for sensing grain transferred from a combine to a grain cart. The system 78 will include the sensors 54/54' and 60 that generate signals indicative of distances between each sensor and a surface area of the grain accumulating in the cart and between the sensor (60) and a ground level as discussed above. These signals are then applied to signal conditioning circuitry 80 that may perform signal conversion, scaling, and any other desired operations. The partially processed signals are then applied to signal processing circuitry 82, which may comprise, for example, digital processors, on-board computers, and so forth. In some embodiments, the signal processing circuitry is part of the combine control circuitry, or a subsystem of such circuitry. Memory circuitry 84 is provided which may store parameters such as settings, scaling factors, data related to geometries of carts, and so forth, but also any programming used for determining heights of the surface areas of grain (and-spout-ground) returning signals to the sensors, and for determining areas, volumes, and other parameters as discussed above.

It is contemplated that the system may allow for delivery of numerical, graphical, auditory, or some other indication to the combine operator related to the determined levels, areas, or volumes of grain being collected in the cart. One or more interfaces 86 will be provided for this purpose. As will be appreciated by those skilled in the art, where desired simple numerical indications may be displayed that indicate height of the grain, distance of the grain from the top of the cart sides, or any other parameter of interest. In addition, graphical displays may indicate the same type of information or even a more or less detailed depiction of filling of one or more sections of the cart. Such graphical representations might also display relative positions of the combine and cart, with progressing grain fill levels. Where desired auditory or other alarms may provide the operator with indications of recommended changes in fill location, for example.

It is also contemplated that the system may allow for open loop operation, where the combine operator, cart operator, or both are prompted to change the relative positions for grain delivery into the cart, but also, where desired, semi or fully automated (e.g., closed loop) operation. For example, cart (or combine) or spout (or nozzle) control circuitry 88 may interact with motion control systems of the combine or the cart, or both, such as via communication circuitry 90, which may be coupled by a network 92 to combine (and/or cart) control systems. In this way, fill levels and locations of filling may be automatically controlled, at least during parts of the harvesting and delivery into a particular cart.

It should be noted that some or all of the components may be provided in the combine, the cart, or both. Some may be provided in one of these, and data transferred to the other, such as by a wireless link. Thus, for example, the sensors may provide signals to circuitry in the cart, and certain raw or processed signals may be provided to the combine. Conversely, the sensors or some other component may provide signals to the combine where these are processed, and some form of processed signal (e.g., positioning recommendations or closed-loop positioning control signals) may be returned from the combine to the cart. All combinations of such components, component locations, and interactive and cooperative processing are contemplated as alternative embodiments of the present disclosure. Moreover, as mentioned above, relative positions of the combine and cart may be adjusted taking into account position determinations (and speeds) made based on GPS or any other suitable positioning system.

Figure 7:
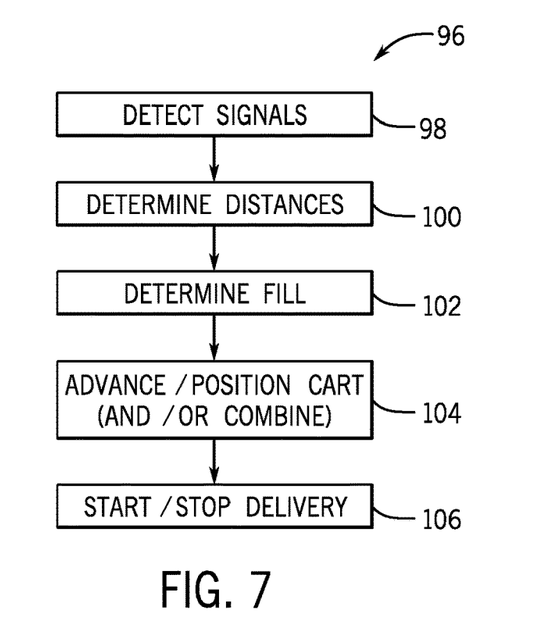
FIG. 7 is a diagram of an exemplary process for sensing and analyzing data relating to filling of a grain cart.

FIG. 7 is a diagram of an exemplary process 96 for sensing and analyzing data relating to filling of a grain cart. In this example, the sensors detect signals at operation 98, such as be emitting radar, ultrasound, or any other desired time-of-flight (or other) signals and detecting returned radiation. As noted above, however, the disclosure is not intended to be limited to these or any particular type of sensor or sensing technology. These signals are conditioned, processed, and ultimately distances between the sensors and the accumulating grain are determined, as indicated at operation 100 (including use of spout-to-ground distance when appropriate). Any other parameter relating to the accumulating grain may then be computed (e.g., areas, volumes, locations, etc.), as indicated at operation 102. Based on these determinations, locations of delivery of grain may be changed to optimize filling of the cart, as indicated by operation 104. Again, these may entail changing of the relative positions of the combine, the cart, or both, or adjustment of some other aspect of the delivery system, such as the spout and/or nozzle positions. Moreover, the system may allow for control of starting and stopping of delivery of grain, as indicated by operation 106. This would be done, for example, when based on the detected grain levels, some problem has been detected that could otherwise result in loss of product or improper filling. Such starting and stopping of delivery will also be done during replacement of a full cart by an empty cart, as indicated by the cart loading analysis.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
a pair of sensors positioned to sense an upper surface of grain being transferred into a grain cart by a combine, the sensors being mounted on a grain spout or nozzle extended from the combine over the grain cart during operation; and
processing circuitry that receives signals indicative of distances between the sensors and the upper surface of the grain based upon output of the sensors, and determines height data representative of height of the grain in the grain cart based on an average of the signals;
wherein the processing circuitry is configured to generate and output control signals based on the height of the grain in the grain cart, wherein the control signals are for:
adjusting a position of the combine or the grain cart or both; or
adjusting a position of the grain spout or nozzle of the combine that extends at least partially over the grain cart during operation.

2. The system of claim 1, wherein the sensors are mounted in fore and aft positions on the grain spout.

3. The system of claim 2, comprising a third sensor mounted to the spout and that senses a distance from the third sensor to a ground level.

4. The system of claim 3, wherein the processing circuitry is configured to determine the height data representative of the height of the grain in the grain cart based on the average of the signals and the distance from the third sensor to the ground level.

5. The system of claim 1, wherein the control signals for adjusting the position of the combine or the grain cart or both cause relative advancement of either the combine or the grain cart with respect to one another.

6. The system of claim 5, wherein the processing circuitry is configured to determine an area or a volume of the grain being transferred to the grain cart based on the output of the sensors.

7. The system of claim 1, wherein each of the sensors is positioned to sense different points of the upper surface of the grain.

8. The system of claim 1, wherein the sensors comprise ultrasonic sensors.

9. The system of claim 1, wherein the sensors comprise radar sensors.

10. The system of claim 1, comprising an operator interface coupled to the processing circuitry and that outputs an operator perceptible notice based on the height of the grain in the grain cart.

11. A system comprising:
first and second sensors positioned to sense an upper surface of grain being transferred into a grain cart by a combine, the first and second sensors being mounted on a grain spout or nozzle of the extended from the combine over the grain cart in operation;
a third sensor mounted to the spout and that senses a distance from the third sensor to a ground level;
processing circuitry that receives signals indicative of distances between the first and second sensors and the upper surface of the grain based upon output of the first and second sensors, and determines height data representative of height of the grain in the grain cart based on an average of the signals;
wherein the processing circuitry is configured to generate and control signals based on the height of the grain in the grain cart, wherein the control signals are for:
adjusting a position of the combine or the grain cart or both; or
adjusting a position of the grain spout or nozzle of the combine that extends at least partially over the grain cart during operation.

12. The system of claim 11, wherein the control signals for adjusting the position of the combine or the grain cart or both cause relative advancement of either the combine or the grain cart with respect to one another.

13. The system of claim 11, comprising an operator interface coupled to the processing circuitry and that outputs an operator perceptible notice based on the height of the grain in the grain cart.

14. The system of claim 11, wherein the processing circuitry is configured to determine the height data representative of the height of the grain in the grain cart based on the average of the signals and the distance from the third sensor to the ground level.

15. A method comprising:
sensing, via a pair of sensors, an upper surface of grain being transferred into a grain cart by a combine, and providing resulting sensed signals to processing circuitry, the sensors being mounted on a grain spout or nozzle extended from the combine over the grain cart during operation, wherein the sensed signals are indicative of distances between the sensors and the upper surface of the grain;
receiving the sensed signals, in the processing circuitry, and determining height data representative of height of the grain in the grain cart based on an average of the sensed signals;
wherein the processing circuitry is configured to generate and control signals based on the height of the grain in the grain cart, wherein the control signals are for:
adjusting a position of the combine or the grain cart or both; or
adjusting a position of the grain spout or nozzle of the combine that extends at least partially over the grain cart during operation.

16. The method of claim 15, comprising a third sensor mounted to the spout and that senses a distance from the third sensor to a ground level.

17. The method of claim 16, wherein determining the height data comprises determining the height data representative of the height of the grain in the grain cart based on the average of the sensed signals and the distance from the third sensor to the ground level.

18. The method of claim 15, wherein the control signals for adjusting the position of the combine or the grain cart or both cause relative advancement of either the combine or the grain cart with respect to one another.

19. The method of claim 15, wherein the processing circuitry is configured to compute volumes of grain in the grain cart based upon the sensed signals.

20. The method of claim 15, comprising providing on an operator interface an operator perceptible notice based on the height of the grain in the grain cart.

* * * * *